United States Patent Office 3,097,108
Patented July 9, 1963

3,097,108
PREPARATION OF AN ALKYL LITHIUM-CATALYZED LIQUID POLYMER HAVING PREDOMINATELY TRANS - 1,4 - UNSATURATION AND CONTAINING 1,3-BUTADIENE, AND COATING METALS WITH SUCH POLYMERS
George Bosmajian, Severna Park, Md., assignor, by mesne assignments, to Cities Service Research and Development Company, New York, N.Y., a corporation of New Jersey
No Drawing. Filed June 29, 1959, Ser. No. 823,305
8 Claims. (Cl. 117—132)

This invention relates to the preparation of coated metal products, particularly specific metals coated with certain polymers of butadiene.

The problem with which this invention is concerned is the protection of metal surfaces against deterioration and particularly against corrosion. It is common to apply coatings comprising polymers to metals such as iron and steel, various metals coated with tin electrolytically or by a hot melt process, metals having protective oxide coatings, examples being anodized aluminum and so-called black iron, aluminum, brass, simulated brass, and other metallic surfaces. A particular area in the art of protective coating of metals in which this invention may be utilized is in the application of coatings to sheet metals and the use of such coated metals in the formation of containers or cans. Closely related articles of manufacture are bottle crowns and screw-top caps.

Resins used in preparing can coatings must meet particularly stringent requirements in view of the fact that such coatings are commonly applied to sheet metal, from which the cans and similar articles are subsequently formed, and the varied contents of such cans include foods which exert a solvent action upon the coating and/or are particularly corrosive as regards the underlying metal surface.

An object of the present invention is the provision of a metal article having a surface coating comprising a specific polymer of butadiene.

Another object of this invention is to provide a process for carrying out the preceding object, including a novel polymerization process.

By way of illustration, the description as to a metal substrate is limited primarily to electrolytic tin coatings upon ferrous metal, black iron, and aluminum, although other metals are useful as hereinafter set forth. A particularly important area of application of this invention is in the can lining art. Of the billions of metallic cans used in the United States annually, approximately 60 percent are food cans, 15 percent are beer cans, and 2 percent are pet food cans. Various organic or resinous linings for such cans have been used in the past for the purpose of supplementing the corrosion resistance of tin plate or as a substitute therefor. Can linings must be resistant to can contents, alkalies, acids, moisture, and solvents. They must be non-toxic, odor-free, and develop no flavors on standing. Processing of the can after applying the coating, involving fabrication, cutting or stamping and the formation of seams, including steps such as soldering, causes many linings to fail. The can may be processed along with its contents for periods of up to an hour or more at temperatures of 200° to 400° F. (93°–204° C., approximately). Commonly the canned products stand for one to two years before being used, and deterioration of the container usually contaminates the contents.

Types of coatings now in use are:
(1) Oleoresins, which are relatively inexpensive, but may have poor storage resistance.
(2) Phenolics, which have good storage resistance, but poor flexibility.
(3) Vinyls, which have good properties as regards undesirable flavors but poor adhesion to metal, and are also expensive.
(4) Epoxies, which are resistant and have good adhesion, but are very expensive.
(5) Butadiene polymers, which promise to combine desirable resistance with low cost, but which ordinarily have been found to be deficient in many important respects.

In addition to can linings the process and product of the present invention include applications such as protective and decorative coatings on articles of hardware such as door knobs, electrical insulation varnishes, and protective coatings for metals in general.

This invention relates to the use of butadiene polymers in coating metals and the products resulting therefrom. Numerous prior attempts have been made to use butadiene polymers and copolymers in operations such as the preparation of can linings, but very few have been found acceptable. Thus, in the use of polymers prepared with Friedel-Crafts catalysts such as aluminum chloride, a common deficiency appears in subjecting the product to "boiling water" tests in that apparently residual aluminum chloride is hydrolyzed to aluminum hydroxide, producing a result called blushing in which the coating has a milky or hazy appearance and in some cases a streaked appearance. Other coatings have been prepared from polymers obtained using various catalysts including sodium, peroxides and other catalysts, and such polymers often have common faults in that they are either too brittle and fracture in operations such as the can forming operation, or are excessively soft and rubbery, and undergo deformation to such an extent that they are unusable.

This invention resides in the discovery that the use of a particular catalyst in the polymerization of butadiene, and the use of the particular polymer resulting therefrom, result in a superior coated metal product.

The reason for superiority of the products of the invention are not fully known, although they are believed to depend upon the macromolecular structure of the polybutadiene coating obtained. The polymerization catalysts, used to prepare the polymer of butadiene which is found to give superior results according to this invention, are certain organo-lithium catalysts, particularly alkyl lithium compounds. It is believed that such catalysts give polymers having a ratio of unsaturation types which is relatively constant, and directly related to the results disclosed herein. "Unsaturation types" as the term is understood in the field of stereochemistry refers to the mode of substitution of hydrogen and carbon atoms about a carbon to carbon double bond, i.e., cis-1,4
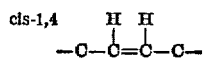

trans-1,4
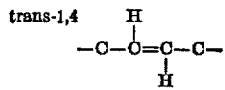

monosubstituted vinyl
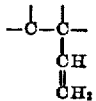

tetrasubstituted vinyl

Typical amounts of such unsaturation types in polybutadiene catalyzed by ethyl lithium according to this invention are in the following ranges:

| | Moles/100 g. |
|---|---|
| Cis-1,4 | 0.1–0.3 |
| Trans-1,4 | 0.8–1.2 |
| Monosubstituted vinyl | 0.1–0.3 |
| Tetrasubstituted vinyl | 0.1–0.5 |

The total amount of unsaturation in any specific case cannot exceed the maximum theoretical quantity of 1.85 moles/100 g. Hence, the ratio of trans-1,4 unsaturation to total saturation will be from about 0.4 to about 0.8. Hereinafter, such ratios of unsaturation types, particularly as to the trans-1,4 type, are intended to be designated wherever a phrase such as "predominately trans-1,4 polymer" is used.

The predominately trans structure enhances the hardness of the coating as contrasted with the cis structure, which confers rubber-like properties upon a polymer. Preferably, a minor proportion of a cis-polybutadiene is present because of its favorable effect upon the flexibility of the coating. However, the invention is not necessarily to be limited to such theory, since some other theoretical explanation for example relating to the catalyst is possible.

The polymers found to give the superior results of this invention are prepared by methods which are well known, in general, although specific features of the polymerization processes are different from prior art methods. Thus, one method of preparation is to react 1,3-butadiene in the presence of an alkyl lithium catalyst and in the presence of a solvent, and permissibly in the presence of a lithium halide such as the bromide or chloride. It is preferable to proceed somewhat differently when polymerizing substituted butadienes such as isoprene.

The method of preparing the polymer determines the usefulness thereof. It may be a semi-solid or solid resinous material dissolved in a solvent, but preferably is an oily liquid, in any case having certain properties of drying oils. The alkyl lithium is dissolved or suspended in a solvent such as hexane or pentane and is combined with butadiene and additional solvent, and the mixture reacted at a temperature between about 0° and 100° C., preferably for at least about two hours at 50° to 60° C. Room temperature, about 20°–25° C. is satisfactory, however.

The preferred monomer is 1,3-butadiene (herein called "butadiene") but other materials may be used therewith or in place thereof. Such materials include 1,3-diolefins such as 2-methyl-1,3-butadiene (isoprene); 1,3-pentadiene (piperylene); 2-chloro-1,3-butadiene (chloroprene); 2,3-dichloro-1,3-butadiene; 2,3-dimethyl-1,3-butadiene, and similar compounds. "A polybutadiene" includes homopolymers and copolymers of such compounds. Preferably copolymers are predominately of butadiene. Minor proportions of monoolefins may also be included, in an amount up to about 10%.

The alkyl lithium catalyst may be ethyl lithium, butyl lithium, amyl lithium, propyl lithium, isopropyl lithium, isobutyl lithium, and similar compounds. In place of those given, other alkyl groups may be used. "Alkyl" is used in the sense as ordinarily understood in the art, and preferably is a saturated straight or branched chain hydrocarbon having between 1 and about 12 carbon atoms. The catalyst as prepared from lithium metal and alkyl halide commonly contains unreacted alkyl halide, lithium halides, and sometimes lithium metal, which at times may be included in the polymerization reaction mixture. Best results are obtained when the alkyl lithium is mixed with a solvent such as pentane or hexane and solids are separated therefrom prior to introduction of the catalyst solution into the reaction zone. As suggested above and shown by the examples given below, the preferred catalyst is predominately an alkyl lithium compound, or even consists essentially of said compound.

When a suspension or slurry including dissolved catalysts and undissolved solids is used the resulting polymer is less desirable for some uses in that the color thereof is often brownish, whereas when only a solution of a catalyst is used the resulting polymer is water white. After the reaction excess catalyst may be reacted with a material such as methanol, and/or removed by centrifuging. Inert diluents or solvents which are useful in the polymerization include benzene, cyclohexane, xylene, nitro- and chlorobenzenes, toluene, solvent naphtha, petroleum ether, pentane, hexane, heptane, octane, "Skellysolve B" (considered to consist of a mixture of hydrocarbons including hexanes, heptanes, octanes, and solvent naphtha, and having a boiling range of 63° C. to 75° C.), and similar compounds.

Inert, non-polar solvents are preferred, more particularly aliphatic hydrocarbon solvents Especially preferred are open chain lower liquid (at room temperature) hydrocarbons having from about 5 to about 10 carbon atoms. Such solvents, for example pentane, hexane, and mixtures thereof, are considered to have a favorable effect upon the geometrical structure of the resulting polymer. A satisfactory ratio of diluent to monomer is 0.7 to 1 although the ratio may be lower, such as .5 to 1 and higher, such as 4 to 1. Preferably relatively pure solvents are used, and compounds or materials which inactivate the catalyst are removed from the raw materials, or contamination therewith is avoided. Toxicity of the solvent may be important where small amounts could be retained in the polymer and the use is in can linings wherein the contents are edible, and in such situations the solvent should be selected accordingly. Mixtures of solvents may be used. Less than .1% alkyl lithium such as ethyl lithium catalyst by weight, based upon monomer weight, and as high as 2.3% by weight of catalyst are useful amounts. The preferred range of ethyl lithium catalyst concentration by weight of butadiene, for example, ranges from about .1% to about .5%. Oxygen, water, olefins, polymerization inhibitors, carbonyl compounds, and oxygenated compounds inactivate the catalyst, and if present make the use of a higher proportion of catalyst necessary.

The temperature is conveniently at 50° to 75° C. Normally, the exothermic nature of the reaction causes the temperature to rise somewhat. Useful temperatures range from about 20° C. to about 80° C., although higher and lower ranges may be utilized. Pressure is not particularly critical although a useful range of maximum values is between about 3 p.s.i.g. and 40 p.s.i.g. These pressures are in part dependent upon the ratio of solvent to monomer, the pressure decreasing as the ratio increases. In batch processes after cooling the reaction vessel the extent of subatmospheric pressure is an indication of the extent of conversion of monomer to polymer. The operable heat-curable polymers of the invention have unsaturation corresponding to a range of iodine values from about 280 to 470 or, in moles of iodine per 100 grams of polymer, corresponding to a range of about 1.1 to 1.85. The viscosity, 50% N.V. (non-volatiles) in xylene at 25° C. preferably correspond to between about 1000 and 5000 centistokes, the operable range being between 3 and 100,000 centistokes, the selection of the coating method being made in consideration of the viscosity, or vice versa. This latter range corresponds to a viscosity of 15 seconds to 300 seconds on a standard No. 4 Ford cup at 25° C. Another way of expressing such viscosity is by intrinsic viscosity, which preferably varies from 0.1 to 0.3 deciliters per gram at 100° F., although in some cases higher and lower values are acceptable.

The particular metal articles useful in this invention are prepared by known methods. Thus conventional tinplate is prepared by electroplating using an aqueous electrolyte to obtain a layer of tin of about 0.03 mil thickness or ¼ pound tin per base box. A base box is the area of 112 sheet metal plates 14 inches by 20 inches equal to 217.78 sq. ft., 20.232 sq. meters, or 31,360 sq. inches. The tin plate may also be ½ pound electro tin plate, and may vary from about ⅛ pound to 10 pounds or more per base box. The surface may be so-called bright tin and/or contain an oxide coating anodically or otherwise produced. Tin plate coated by hot-dip methods is useful. For the production of black steel or iron conventional treatments include using hot aqueous solutions of alkaline compounds such as sodium hydroxide and alkali metal nitrates and nitrites, in which case a black oxide coating is obtained. Other metal surfaces may also be treated according to this invention. For example aluminum, rolled or "spun," may be coated without further treatment or may have an anodically produced aluminum oxide coating thereupon, which in turn may be a porous oxide or may be sealed with hot water, steam, or certain nickel and cobalt salts. In addition, steel, zinc, galvanized ferrous metal, copper, brass, and other metal surfaces may be treated using the process of this invention and to obtain the product of this invention.

The following are representative of the novel methods which may be used to prepare the polybutadienes useful in this invention to form baked, resinous coatings:

*Example 1*

Butadiene, as a 30% solution in hexane was subjected in a sealed "bomb" to a temperature of 23° C. for 24 hours in the presence of 0.9% ethyl lithium catalyst, by weight, dispersed in pentane. The bomb was agitated to assure dispersion of the catalyst. The polybutadiene was recovered in 92% yield by weight in the form of a clear white viscous polymer having about 1.78 moles of unsaturation per 100 grams (iodine number 453) as determined by chemical methods (1.32 moles of unsaturation per 100 grams of polymer by infrared methods, after a lapse of several months), and a viscosity in centistokes at 50° C. of 1,180, at 100% N.V. Methanol precipitation and vacuum drying at about 10° C. were used to recover the polymer.

*Example 2*

Butadiene, 400 grams, was introduced into a 1 gallon autoclave as a 30% solution in dry petroleum ether, B.P. 63–75° C. About 0.25 mole ethyl lithium as a suspension in 200 ml. of pentane, the suspension comprising dissolved catalyst and lithium halide, was introduced into the autoclave. The temperature was held between 50° C. and 60° C. for 2.5 hours then allowed to return to room temperature after which the materials remained in the reactor overnight, approximately an 18-hour additional period. About 95% of the butadiene was converted to products, 100% of which is polybutadiene useful in this invention. (The latter figure will hereinafter be called selectivity.) The polymer was a brown oily liquid having unsaturation by chemical methods corresponding to 1.64 moles/100 g. and an intrinsic viscosity at 100° F. of 0.12 dl./g. Values for unsaturation types as determined by infrared spectroscopy for this polymer are: cis-1,4=0.19 mole/100 g.; trans-1,4=0.93 mole/100 g.; and monosubstituted vinyl=0.21 mole/100 g. Tetra-substituted vinyl unsaturation which is 0.31 mole/100 g. in this case is determined by subtracting total infrared unsaturation from total chemical unsaturation.

*Example 3*

Example 2 was repeated using a commercial ethyl lithium catalyst and holding the temperature at 50–60° C. for two hours. The conversion was 83% and the selectivity 100%. A similar polymer was produced.

*Example 4*

Following the procedure of Example 2 but using a 500 ml. pentane solution of only the pentane-soluble portion of the ethyl lithium catalyst, approximately 0.1 mole, and maintaining the temperature at 55° C. for two hours, after which the reaction was terminated, resulted in a conversion of 98% and a selectivity of 100%. The polymer in this case was water white, having chemically determined unsaturation corresponding to 1.65 moles/100 g. and a viscosity of 0.14 dl./g. (100° F.).

*Example 5*

Example 4 was repeated using half the amount of catalyst therein, and varying the temperature by conducting the reaction at 25° C. for four hours, 55° C. for two hours, and 25° C. for 72 hours. Conversion was 34% and selectivity 75%. The polymer was precipitated by methanol, as it was in the other examples. A solution of 67% of polymer in xylene was water white.

*Example 6*

Repeating the procedure of Example 5 but using catalyst recovered from the residue of the reaction of Example 5 and maintaining the temperature at 50° C. for four hours resulted in a conversion of 100% at a selectivity of 90 percent, giving a brown oily polymer having an unsaturation corresponding to 1.66 moles/100 g. and a viscosity of 0.26 dl./g. (100° F.).

*Example 7*

Using catalyst recovered from the residue of Example 6 in a proportion of approximately 0.1 mole, the temperature being 55° C. for 2.5 hours, conversion was 100%, selectivity was 85%, and a light brown oily polymer having chemically determined unsaturation corresponding to 1.43 moles/100 g. (1.33 moles/100 g. by infrared spectroscopy) and a viscosity of 0.21 dl./g. (100° F.) was recovered.

The process of this invention comprises coating a metal surface with a trans-1,4-polybutadiene and baking the coated metal to obtain the product of the invention. In the case of a flat metal article such as tin plate, the polybutadiene, for example as a 50% solution of non-volatile solids in xylene, may be roller coated by conventional procedures. Other coating methods may be used, including brushing, spraying and immersing or dipping an article in the resinous composition, the viscosity of the compounded polymer being related to the coating method used. Preferably the polymer coating is cured in the presence of air at temperatures between about 150° C. and about 500° C. for a period of between about 0.1 second and about 15 minutes. In addition to conventional baking ovens, using radiated heat for example, induction heating may be used, on the coated metal sheet or on a formed can coated after forming with the polymer utilized. Hot natural gas combustion products, comprising air, may come into direct contact with the coating being cured. The mechanism of curing is analogous to that of natural drying oils, and involves oxidation and further polymerization of the synthetic drying oil or polymer.

A typical procedure to test a polymer is to dilute the polymer to 50% non-volatiles (N.V.) in xylene, and to utilize a drawbar to manually apply a wet film of polymer in solution 1 mil thick, the metal substrate being ¼ pound electrolytic tin plate. In curing the polymer identical test blanks were subjected to different temperatures, the representative ones chosen here being approximately 350° F., 400° F., and 450° F., maximum metal temperature. The articles were subjected to these temperatures for a period of ten minutes.

Some of the objectives and subjective tests of the cured test blank may be defined as follows:

I. Appearance; physical characteristics of the film such as normal, graininess, eyeholes, haziness. In some instances such defects are remedied by selection and concentration of solvent, cleaning the base, compounding, and/or careful curing.

II. Dry properties of the surface of the film; termed normal, soft, tacky, subject to marring.

III. Integrity; test is performed by peeling the film with a knife blade, the terms applied being "good" if the film is removed as a continuous or substantially continuous strip which curls and maintains its integrity, or as "short" if the film crumbles.

IV. Knife adhesiveness; determined by scraping a knife blade across the film.

V. Wedge bend; five pound weight dropped on wedge of varying sharpness which is placed against a coated sheet of tin plate bent generally into a U-shape with the wedge placed in the trough formed thereby. This measures the adhesion, flexibility, and impact resistance of the film, and simulates the formation of a side seam in a can forming operation. Evaluation of this test is performed by immersing the article in a solution of copper sulfate treated to plate copper onto the exposed metallic surface. A score of 100 is perfect.

VI. 202 can end fabrication; testing of an assembled can end which is placed in copper sulfate solution. This measures adhesion and abrasion resistance of a can end double seam, and is rated good, fair, poor or numerically.

VII. Boiling water; the coated article is placed in boiling water to obtain an indication of the ability of the film to withstand high temperature processes. Any whitening of the film is called blushing, and any peeling of the film is noted. If the film is satisfactory in this test, it is rated as "passing" the test.

The wet film is between 0.005 and 75 mils thickness, preferably between 0.1 and 2.0 mils, and has a non-volatile polymer content of from 10% to 100%, preferably 50% to 60%, as a minimum. The dry film is between about .005 and 50 mils in thickness, and preferably is present in an amount corresponding to 2 to 7 mg./sq. in., although not limited generally to this weight, the approximate operable range for most uses being 0.3 to 50 mg./sq. in.

Example 8

The polymers prepared above were applied to commercial ¼ pound box basis electrolytic tin plate with no preliminary solvent or vapor degreasing operation, as a 1 mil wet film, 50% N.V. and subjected to the described standard evaluation procedures with the following results:

| Polymer No. | Bake, °F. | Dry | Integrity | Knife Adh. | Wedge Bend | 202 Can End | Boil. Water |
|---|---|---|---|---|---|---|---|
| 1 | 350 | Normal | Fair | Good | 80 | 70 | Pass. |
|   | 400 | do | Short | do | 84 | 70 | Do. |
|   | 450 | do | do | Fair | 30 | 30 | Do. |
| 2 | 350 | do | Good | Good | 75 | 70 | Do. |
|   | 400 | do | Short | do | 56 | 50 | Do. |
|   | 450 | do | do | do | 34 | 0 | Do. |
| 3 | 350 | do | Good | do | 73 | 60 | Do. |
|   | 400 | do | Fair | Fair | 58 | 50 | Do. |
|   | 450 | do | Short | do | 28 | 0 | Do. |
| 4 | 350 | do | Good | Good | 75 | 60 | Do. |
|   | 400 | do | Short | do | 56 | 40 | Do. |
|   | 450 | do | do | Fair | 29 | 0 | Do. |
| 5 | 350 | do | Good | Good | 64 | 50 | Do. |
|   | 400 | do | Short | Fair | 49 | 25 | Do. |
|   | 450 | do | do | do | 30 | 0 | Do. |
| 6 | 350 | do | Good | Good | 71 | 60 | Do. |
|   | 400 | do | Poor | Fair | 59 | 50 | Do. |
|   | 450 | do | Short | do | 32 | 0 | Do. |
| 7 | 350 | do | Good | Good | 82 | 60 | Do. |
|   | 400 | do | Fair | do | 61 | 50 | Do. |
|   | 450 | do | Short | Fair | 40 | 10 | Do. |

An important advantage is that commercial tin plate may be used without preliminary removal of oily coatings commonly present. In some cases, however, uncleaned plate seemed to detract from the quality of the coating in that "eyeholes" appear. The eyeholes are undesirable for some uses and the condition is corrected by purifying the polymer, cleaning the metal, or compounding the polybutadiene with materials which "wet" the metal for example, and include vinyl type polymers such as polyvinyl butyral, silicone oils and resins, natural drying oil type polymers, "Cellosolve" plasticizers, aluminum isopropylate and 2-ethylhexanol, pine oil, and various wetting agents.

Example 9

A copolymer of 1,3-butadiene and isoprene prepared as in Example 4, the monomers being present in a ratio of about 20 to 1 in the reactor charge, results in a polymer having the trans-1,4 configuration and having the properties of the polymers useful in this invention.

Example 10

Using butyl lithium and propyl lithium in place of ethyl lithium used in the procedure of Example 4 gives comparable results.

The polymers may be carboxylated or otherwise modified by known methods to permit supplemental or other methods of curing, as by the use of polyamines.

Example 11

Using black iron (CMQ black plate) in place of the substrate of Example 8, comparable results were obtained.

Example 12

Using sheet aluminum in place of the tin plate of Example 8, superior results were achieved in most tests.

Example 13

Additional tests including food process tests, solvent resistance, can end tests using a top coat of polyvinyl acetate-vinylchloride copolymer at 5.5 mg./sq. in., 50 minutes submersion of the single-coat panels in 150° F. (approximately 66° C.) water, resistance to scorching at 700° F. (about 371° C.) for 3 minutes, and toothpaste and detergent tests gave results superior in most tests to similar polybutadienes prepared by other methods and presumably having different macromolecular structures.

Thus, when the above tests were applied to polybutadiene coatings prepared by similar methods but using aluminum chloride catalyst or sodium catalyst, the coatings failed one or more of the tests, notably wedge bend, can end, and boiling water.

Driers, including manganese and cobalt phthalates and oleates are beneficial in some cases; naphthenates are not geenrally acceptable. The trans-1,4-polybutadiene may be compounded with other materials including natural drying oils, pigments, and plasticizers.

As used above, the extent of the reaction, using butadiene for illustrative purposes, is calculated as follows:

$$\text{Conversion} = \frac{\text{wt. butadiene consumed} \times 100}{\text{wt. total butadiene fed}}$$

$$\text{Selectivity} = \frac{\text{wt. of a single product} \times 100}{\text{wt. butadiene consumed}}$$

The yield based on the amount of butadiene fed or introduced into the reaction zone may be calculated by multiplying selectivity by the conversion of butadiene to products and dividing by 100. Unless otherwise stated, all quantities are on a weight basis.

I claim:

1. As an article of manufacture, a sheet metal article having a surface thereof coated with a thin layer of air-cured, resinous, alkyl lithium-catalyzed polymer of 1,3-butadiene, said catalyst being selected from the group consisting of (1) a composition containing a predominate proportion of an alkyl lithium and (2) consisting essentially of an alkyl lithium and a lithium halide admixture.

2. A process of preparing a metal article having a protective coating thereupon comprising the steps of coating a surface of said metal article with a liquid polymer composition comprising an alkyl lithium-catalyzed polymer of 1,3-butadiene, and curing the coating to a hard, resinous adherent film, said catalyst being selected from the group consisting of (1) a composition containing a predominate proportion of an alkyl lithium and (2) consisting essentially of an alkyl lithium and a lithium halide admixture.

3. As an article of manufacture, a metallic container having at least the interior surface thereof coated with a thin layer of an air-cured, resinous, alkyl lithium-catalyzed, polymer of 1,3-butadiene, said catalyst being selected from the group consisting of (1) a composition containing a predominate proportion of an alkyl lithium and (2) consisting essentially of an alkyl lithium and a lithium halide admixture.

4. A method of preparing a metal article having a protective coating thereupon comprising the steps of polymerizing a polymerizable monomeric unsaturated material having at least 90% 1,3-butadiene in the presence of a catalyst containing at least a predominate proportion of an alkyl lithium compound, thereafter obtaining the polymer in the form of a liquid composition, coating a surface of said article with said liquid polymer composition and curing the coating to a hard, resinous, adherent film.

5. A method for preparing an unsaturated predominately trans-1,4-polybutadiene in the form of a liquid polymer, comprising polymerizing a polymerizable monomeric unsaturated material containing at least 90% 1,3-butadiene at a temperature between about 20° C. and 80° C., in the presence of a catalyst selected from the group consisting of (1) a composition consisting essentially of an alkyl lithium and (2) consisting essentially of an alkyl lithium and a lithium halide in admixture, in the presence of a non-polar hydrocarbon solvent, and recovering the liquid, unsaturated, predominately trans-1,4-polybutadiene.

6. The method of claim 5 in which the solvent is an open chain normally liquid hydrocarbon having from about 5 to about 10 carbon atoms.

7. The process of claim 6 in which said catalyst comprises ethyl lithium.

8. The method of claim 6 in which said catalyst comprises butyl lithium.

References Cited in the file of this patent

UNITED STATES PATENTS

| | | |
|---|---|---|
| 2,797,208 | Burke | June 25, 1957 |
| 2,876,207 | Henderson | Mar. 3, 1959 |
| 2,908,672 | Jackson | Oct. 13, 1959 |
| 2,913,444 | Diem et al. | Nov. 17, 1959 |
| 2,917,391 | Canniff et al. | Dec. 15, 1959 |
| 2,965,625 | Anderson et al. | Dec. 20, 1960 |

OTHER REFERENCES

"Polymer Processes," Schildknecht, Interscience Publishers, 1956 (pp. 226 to 229 relied upon).

"Linear and Stereoregular Addition Polymers," Gaylord and Mark, 1959 (pp. 398, 399, 406 and 407).

Notice of Adverse Decision in Interference

In Interference No. 94,075 involving Patent No. 3,097,108, G. Bosmajian, PREPARATION OF AN ALKYL LITHIUM-CATALYZED LIQUID POLYMER HAVING PREDOMINATELY TRANS-1,4-UNSATURATION AND CONTAINING 1,3-BUTADIENE, AND COATING METALS WITH SUCH POLYMERS, final judgment adverse to the patentee was rendered Dec. 9, 1965, as to claims 1, 2, 3 and 4.

[*Official Gazette May 17, 1966.*]